United States Patent
Si et al.

(10) Patent No.: US 9,849,863 B2
(45) Date of Patent: Dec. 26, 2017

(54) VEHICLE PARKING INTERLOCK SYSTEM AND METHOD

(71) Applicant: BYD COMPANY LIMITED, Shenzhen (CN)

(72) Inventors: Wenkui Si, Shenzhen (CN); Caihua Pan, Shenzhen (CN); Wengang Luo, Shenzhen (CN); Jun Wu, Shenzhen (CN)

(73) Assignee: BYD COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/704,753

(22) Filed: May 5, 2015

(65) Prior Publication Data

US 2015/0321654 A1 Nov. 12, 2015

(30) Foreign Application Priority Data

May 9, 2014 (CN) .......................... 2014 1 0197179

(51) Int. Cl.
*B60T 17/18* (2006.01)
*B60Q 9/00* (2006.01)
(Continued)

(52) U.S. Cl.
CPC ................ *B60T 7/12* (2013.01); *B60Q 9/002* (2013.01); *B60R 16/023* (2013.01); *B60T 7/085* (2013.01);
(Continued)

(58) Field of Classification Search
CPC .......... B60T 7/12; B60T 7/085; B60T 17/221; B60T 17/18; B60W 40/105; B60W 10/08;
(Continued)

(56) References Cited

U.S. PATENT DOCUMENTS

2003/0060327 A1* 3/2003 Williams ................. B60K 6/22
477/99
2003/0154945 A1 8/2003 Ando et al.
(Continued)

FOREIGN PATENT DOCUMENTS

CN 1593975 A 3/2005
CN 102371912 A 3/2012
(Continued)

OTHER PUBLICATIONS

BYD Company Limited, Extended European Search Report, EP15788696.1, dated Apr. 18, 2017, 8 pgs.

*Primary Examiner* — Adam R Mott
(74) *Attorney, Agent, or Firm* — Morgan, Lewis & Bockius LLP

(57) ABSTRACT

A parking interlock system and method for a vehicle is provided. The system includes: a safety state information detecting unit, configured to detect safety state information of the vehicle; an operating state information detecting unit, configured to detect operating state information of the vehicle; a brake; a motor; a low voltage controller, connected to the safety state information detecting unit and the brake respectively, and configured to generate a safety state judgment result based on the safety state information of the vehicle; and a motor controller, connected to the safety state information detecting unit and the motor respectively, and configured to control the motor according to the safety state judgment result received from the low voltage controller, and to send the operating state information of the vehicle to the low voltage controller such that the low voltage controller controls the brake according to the operating state information.

8 Claims, 10 Drawing Sheets

(51) Int. Cl.
*F02N 11/08* (2006.01)
*B60T 7/12* (2006.01)
*B60R 16/023* (2006.01)
*B60W 40/12* (2012.01)
*B60T 7/08* (2006.01)
*B60T 17/22* (2006.01)
*B60W 10/08* (2006.01)
*B60W 10/18* (2012.01)
*B60W 40/00* (2006.01)
*B60W 40/105* (2012.01)

(52) U.S. Cl.
CPC ............ *B60T 17/18* (2013.01); *B60T 17/221* (2013.01); *B60W 10/08* (2013.01); *B60W 10/18* (2013.01); *B60W 40/00* (2013.01); *B60W 40/105* (2013.01); *B60W 40/12* (2013.01); *F02N 11/08* (2013.01)

(58) Field of Classification Search
CPC ...... B60W 40/00; B60W 40/12; B60W 10/18; B60Q 9/002; F02N 11/08; B60R 16/023; B60K 28/10–28/12
See application file for complete search history.

(56) References Cited

U.S. PATENT DOCUMENTS

| | | | | |
|---|---|---|---|---|
| 2008/0224841 | A1* | 9/2008 | Lundgren | ............... B60T 17/22 340/453 |
| 2011/0136625 | A1* | 6/2011 | Yu | ......................... B60W 10/06 477/185 |
| 2012/0319465 | A1* | 12/2012 | Koyama | ................... B60T 1/10 303/3 |
| 2013/0252785 | A1 | 9/2013 | Kinoshita et al. | |
| 2014/0172263 | A1* | 6/2014 | Agnew | ..................... B60T 7/22 701/78 |

FOREIGN PATENT DOCUMENTS

| | | |
|---|---|---|
| CN | 103052530 A | 4/2013 |
| CN | 103161942 A | 6/2013 |
| CN | 103183030 A | 7/2013 |
| CN | 103419788 A | 12/2013 |
| CN | 203331840 U | 12/2013 |
| CN | 103770775 A | 5/2014 |
| DE | 10211463 B3 | 1/2004 |
| DE | 102011078788 A1 | 1/2013 |
| DE | 102011107005 A1 | 1/2013 |
| EP | 1612408 A1 | 1/2006 |
| EP | 2360077 A | 8/2011 |
| EP | 2407656 A1 | 1/2012 |
| FR | 2955072 A1 | 7/2011 |
| FR | 2955902 A1 | 8/2011 |
| FR | 2967122 A1 | 5/2012 |
| JP | 2009132270 A | 6/2009 |
| JP | 2014-79087 A | 5/2014 |
| WO | WO2011/127034 A1 | 10/2011 |
| WO | WO2013/045790 A2 | 4/2013 |

* cited by examiner

VEHICLE PARKING INTERLOCK SYSTEM AND METHOD

CROSS-REFERENCE TO RELATED APPLICATION

This application claims priority to and benefits of Chinese Patent Application No. 201410197179.4, entitled "Vehicle parking interlock system and method," filed with the State Intellectual Property Office of P. R. China on May 9, 2014, the entire content of which is incorporated herein by reference.

TECHNICAL FIELD

The present disclosure relates to a vehicle field, and more particularly to a vehicle parking interlock system and a vehicle parking interlock method.

BACKGROUND

At present, there are different safety requirements for vehicle driving in different countries and regions. For example, in some countries, the vehicle is not allowed to run when the door is open, the guide is open, or the air suspension is a kneeling state. When the vehicle is driving on a ramp, safety requirement is enhanced, in which it is important to prevent a slip. Since the driver needs to operate multiple driving equipments simultaneously, the traffic safety is reduced. If the driver looses the brake lever too early, the slip may happen to the vehicle, and if the driver looses the brake lever too late, the traditional fuel vehicle may be stalled, and a motor of the new energy vehicle may suffer an over high current, or even a chassis is damaged.

Therefore, there is a need to provide a parking interlock system for a vehicle.

SUMMARY

Embodiments of the present disclosure seek to solve at least one of the problems existing in the related art to at least some extent.

A first objective of the present disclosure is to provide a parking interlock system for a vehicle.

A second objective of the present disclosure is to provide a parking interlock method for a vehicle.

In order to achieve above objectives, embodiments of a first aspect of the present disclosure provide a parking interlock system for a vehicle. The system includes: a safety state information detecting unit, configured to detect safety state information of the vehicle; an operating state information detecting unit, configured to detect operating state information of the vehicle; a brake; a motor; a low voltage controller, connected to the safety state information detecting unit and the brake respectively, and configured to generate a safety state judgment result based on the safety state information of the vehicle; and a motor controller, connected to the safety state information detecting unit and the motor respectively, and configured to receive the safety state judgment result from the low voltage controller, to control the motor according to the safety state judgment result, and to send the operating state information of the vehicle to the low voltage controller such that the low voltage controller controls the brake according to the operating state information of the vehicle.

With the parking interlock system for a vehicle according to embodiments of the present disclosure, the safety state information detecting unit detects the safety state information of the vehicle, the operating state information detecting unit detects the operating state information of the vehicle, the low voltage controller generates the safety state judgment result according to the safety state information of the vehicle, and by sharing the safety state judgment result and the operating state information of the vehicle between the low voltage controller and the motor controller via communication, the low voltage controller controls the brake according to the operating state information of the vehicle, and the motor controller controls the motor according to the safety state judgment result. Thus, a safety of the vehicle may be improved, and a user experience may be enhanced.

In order to achieve above objectives, embodiments of a second aspect of the present disclosure provide a parking interlock method for a vehicle. The method includes: detecting safety state information of the vehicle; detecting operating state information of the vehicle; generating a safety state judgment result based on the safety state information of the vehicle; controlling a brake according to the operating state information of the vehicle; and controlling a motor according to the safety state judgment result.

With the parking interlock method for a vehicle according to embodiments of the present disclosure, by detecting the safety state information and the operating state information of the vehicle, generating the safety state judgment result according to the safety state information of the vehicle, and controlling the brake according to the operating state information of the vehicle and controlling the motor according to the safety state judgment result, the safety of the vehicle may be improved, and the user experience may be enhanced.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
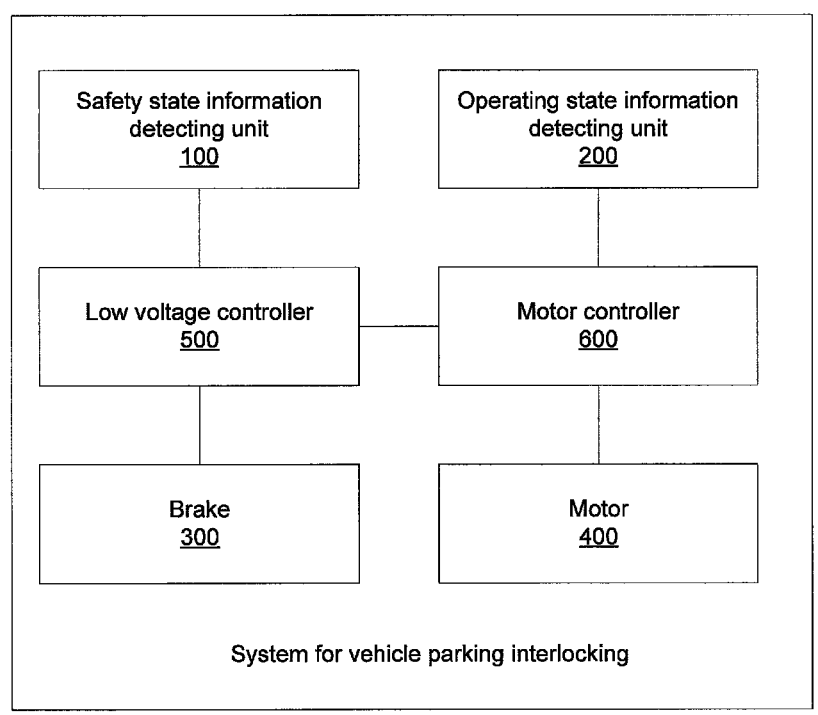
FIG. 1 is a block diagram of a parking interlock system for a vehicle according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, unless specified or limited otherwise, it should be noted that, terms "mounted," "connected" and "coupled" may be understood broadly, such as electronic connections or mechanical connections, inner communications between two elements, direct connections or indirect connections via intermediary structures. These having ordinary skills in the art should understand the specific meanings in the present disclosure according to specific situations.

A parking interlock system for a vehicle and a parking interlock method for a vehicle will be described in the following with reference to drawings.

FIG. 1 is a block diagram of a parking interlock system for a vehicle according to an embodiment of the present disclosure. The system includes a safety state information detecting unit 100, an operating state information detecting unit 200, a brake 300, a motor 400, a low voltage controller 500 and a motor controller 600. The safety state information detecting unit 100 is configured to detect safety state information of the vehicle.

In some embodiments, the safety state information of the vehicle may include at least one of charging gun state information (e.g., a charging gun is connected to the vehicle), disabled guide state information (e.g., the disabled guide is in an open state or a closed state), door state information (e.g., the door is in an open state or a closed state), and ECAS (Electronically Controlled Air Suspension) state information (e.g., the air suspension is in a kneeling state).

In some embodiments, the charging gun state information is generated by a charging gun state sensor, the disabled guide state information is generated by a disabled guide state sensor, the door state information is generated by a door state sensor, and the ECAS state information is obtained by an ECAS state sensor.

In some embodiments, when at least one of the above conditions happens, such as the charging gun is connected to the vehicle, the disabled guide is opened, the door is opened, or the air suspension is in the kneeling state, there is a safety risk when the vehicle starts to move.

The operating state information detecting unit 200 is configured for detecting the operating state information of the vehicle.

In some embodiments, the operating state information of the vehicle may include vehicle speed information and torque information.

In some embodiments, the vehicle speed information is generated by a vehicle speed sensor, and the torque information is acquired from calculating by the motor controller 600.

The low voltage controller 500 is connected to the safety state information detecting unit 100 and the brake 300 respectively. The low voltage controller 500 is configured to generate a safety state judgment result based on the safety state information of the vehicle output from the safety state information detecting unit 100.

In some embodiments, the brake 300 is configured as a brake solenoid valve.

In some embodiments, when the safety information detecting unit 100 detects at least one of conditions in which the charging gun is connected to the vehicle, the disabled guide is opened, the door is opened, and the air suspension is in the kneeling state, the safety state judgment result is "the vehicle is in an unsafe condition at this time".

In some embodiments, the motor controller 600 is connected to the operating state information detecting unit 200 and the motor 400 respectively. The low voltage controller 500 and the motor controller 600 communicate with each other. The low voltage controller 500 sends the safety state judgment result to the motor controller 600, and the motor controller 600 sends the operating state information of the vehicle to the low voltage controller 500. The low voltage controller 500 controls the brake 300 according to the operating state information of the vehicle, and the motor controller 600 controls the motor 400 according to the safety state judgment result.

In some embodiments, the low voltage controller 500 and the motor controller 600 communicate with each other via a CAN (Controller Area Network) network for information exchange, and also communicate with the whole vehicle via the CAN network, in which bit rates of the low voltage controller 500 and the motor controller 600 are required to be matched with each other.

Figure 2:
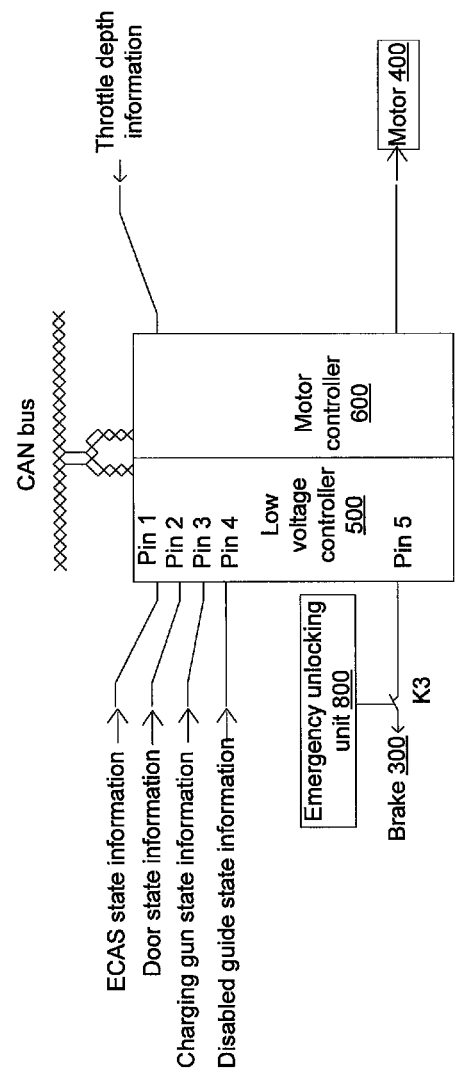
FIG. 2 is a schematic diagram showing a signal flow in a parking interlock system for a vehicle according to an embodiment of the present disclosure.

FIG. 2 shows a signal flow in the parking interlock system of the vehicle. As shown in FIG. 2, the low voltage controller 500 sends the safety state judgment result to the motor controller 600, and the motor controller 600 sends the operating state information of the vehicle to the low voltage controller 500, such that the low voltage controller 500 controls the brake 300 according to the operating state information of the vehicle, and the motor controller 600 controls the motor 400 according to the safety state judgment result.

Figure 3:
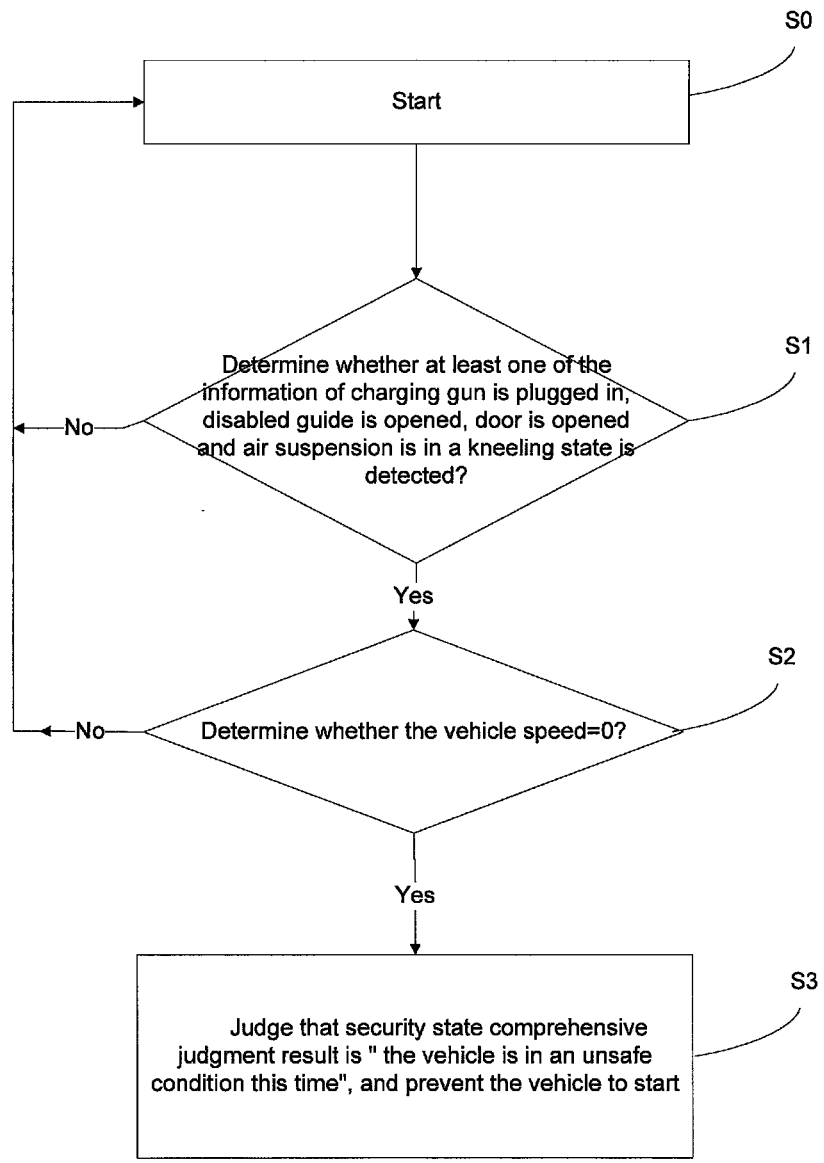
FIG. 3 is a flow chart of a parking interlock method for a vehicle according to an embodiment of the present disclosure.

In some embodiments, the parking interlock system for the vehicle may realize a vehicle starting prevention function. As shown in FIG. 3, the system may realize the vehicle starting prevention function by performing following steps.

At step S1, it is determined whether one of the following conditions is satisfied, i.e., whether the charging gun is connected to the vehicle, whether the disabled guide is opened, whether the door is opened and whether the air suspension is in the kneeling state. If any one of the above conditions is satisfied, step S2 is executed, and if none of the above conditions is satisfied, step S0 is executed.

At step S2, it is determined whether the vehicle speed is zero. If yes, step S3 is executed, and if no, step S0 is executed.

At step S3, it is determined that safety state judgment result is "the vehicle is in an unsafe condition at this time", and the vehicle is prevented from starting.

If the safety state judgment result is "the vehicle is in an unsafe condition at this time" when the vehicle is to be started, it needs to prevent the vehicle from starting, and then the low voltage controller 500 sends the safety state judgment result to the motor controller 600, and the motor controller 600 does not output torque, thereby preventing the vehicle from starting. Generally, a vehicle, for example, a bus, does not have the function of starting prevention, so the driver needs to observe the state of the vehicle and perform corresponding operations manually, which may distract the driver's attention and may also have the disadvantage of cumbersome operating. With the vehicle starting prevention function according to an embodiment of the present disclosure, user experience may be enhanced and vehicle safety may be improved. In addition, the information (i.e., the safety state judgment result) sent by the low voltage controller 500 only occupies one message signal for notifying the motor controller 600 whether the vehicle is safe.

With the parking interlock system for the vehicle according to embodiments of the present disclosure, the safety state information detecting unit detects the safety state information of the vehicle, the operating state information detecting unit detects the operating state information of the vehicle, the low voltage controller generates the safety state judgment result according to the safety state information of the vehicle, and by sharing the safety state judgment result and the operating state information of the vehicle between the low voltage controller and the motor controller via communication, the low voltage controller controls the brake according to the operating state information of the vehicle, and the motor controller controls the motor according to the safety state judgment result. Thus, the safety of the vehicle may be improved, and the user experience may be enhanced.

Figure 4:
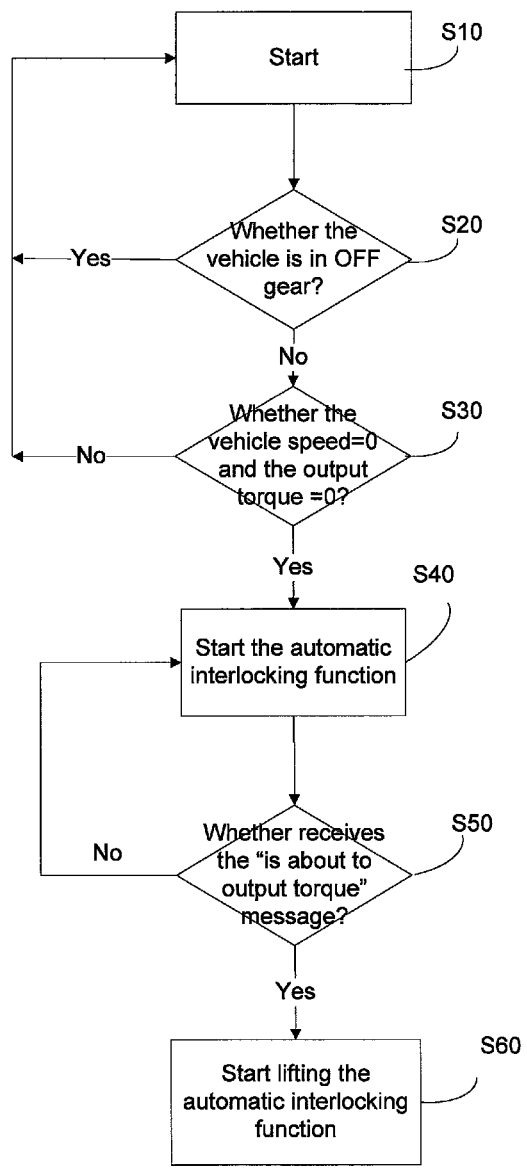
FIG. 4 is a flow chart of a parking interlock method for a vehicle according to an embodiment of the present disclosure.

In some embodiments, the parking interlock system for the vehicle may also realize an automatic interlock function and an automatic interlock lifting function. As shown in FIG. 4, the system may realize the automatic interlock function and the automatic interlock lifting function by performing following steps.

At step S20, it is determined whether the vehicle is in OFF gear. If yes, step S10 is executed, and if no, step S30 is executed.

At step S30, it is determined whether the vehicle speed is zero and whether the output torque is zero, if yes, step S40 is executed, and if no, step S10 is executed.

At step S40, the automatic interlock function is started.

At step S50, it is determined whether a message "being about to output torque" is received. If yes, step S60 is executed, and if no, step S40 is returned to. At step S60, the interlock is automatically lifted.

The automatic interlock function is described in the following.

In some embodiments, when the low voltage controller 500 determines that the vehicle speed and the output torque of the motor are zero within a first predetermined period, it controls the brake 300 to lock the vehicle at an end of the first predetermined period. For example, when the low voltage controller 500 determines that the vehicle speed and the output torque of the motor remains zero for 0.5 s, it controls the brake 300 to lock the vehicle. The first predetermined period is a delay time before starting the automatic interlock function.

Figure 5:
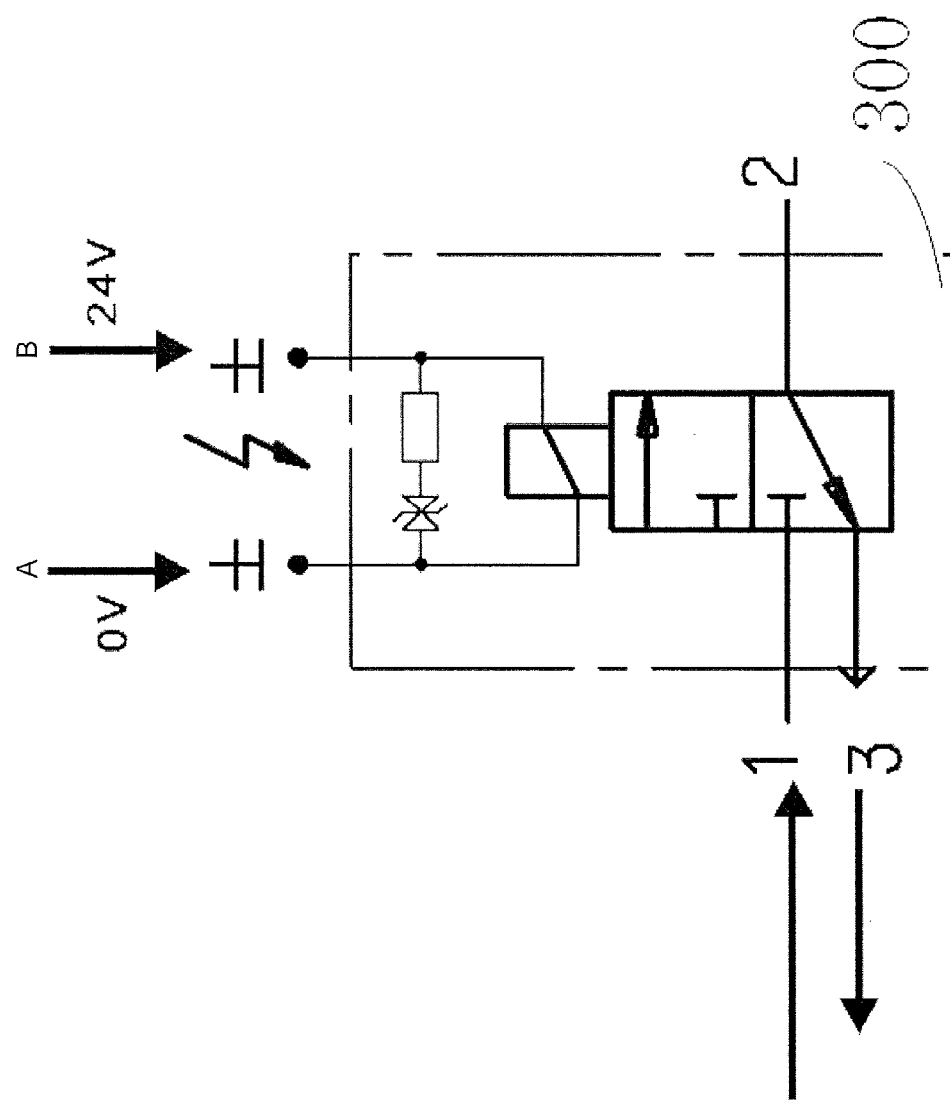
FIG. 5 is a schematic diagram showing a principle of a brake according to an embodiment of the present disclosure.

A braking principle of the brake 300 is illustrated as follows. FIG. 5 is a schematic diagram showing the braking principle of the brake according to an embodiment of the present disclosure. As shown in FIG. 5, the brake 300 may include a grounded end A, a power supply end B, an inlet 1, an outlet 3 and a valve body 2. When the grounded end A is grounded and the power supply end B is connected to a power supply of 24V, the inlet 1 is connected to the valve body 2 and the valve body 2 is driven by the gas source to lock the wheels of the vehicle. When the power supply end B is disconnected from the power supply of 24V, the outlet 3 is connected to the valve body 2, and the inlet 1 is isolated with the valve body 2, such that there is no gas source to drive the valve body 2 to lock the wheels, and thus the locking of the wheels is terminated.

The automatic interlock lifting function is described as follows.

In some embodiments, the motor controller 600 is further configured to send a motor starting instruction to the low voltage controller 500, and to start the motor 400 when a second predetermined period has elapsed after the motor starting instruction is sent. The low voltage controller 500 is configured to control the brake 300 to unlock the vehicle according to the motor starting instruction within a third predetermined period. The third predetermined period is less than the second predetermined period.

In some embodiments, when the vehicle is stationary, the motor controller 600 performs a filtering processing on a throttle depth. When the "start" operation of the driver is confirmed, the motor controller 600 sends the "being about to output torque" message signal (i.e., the motor starting instruction) to the low voltage controller 500 for notifying, and the sending continues for 1 seconds. When the low voltage controller 500 receives the message signal, the low voltage controller 500 cancels the driving to the brake 300 within the third predetermined period (e.g., 0.05 seconds) so as to unlock the vehicle, and also sends a message "automatic interlock lifting" (the message is used for diagnostic, and the motor controller 600 no longer collects the message). In addition, it should be ensured that the torque is output when 0.3 seconds has elapsed since the message signal "being about to output torque" is sent out. Thus, a seamless transition between parking and starting is achieved, especially when the vehicle is starting on a ramp, thus enhancing the traffic safety on the ramp.

It should be noted that, the throttle depth signal is collected by the motor controller 600. The motor controller 600 needs to perform filtering and smoothing on the throttle depth signal to remove jitter and to confirm that the throttle depth signal is generated due to an intentional operation of the driver instead of a signal fluctuation. The main purpose of setting the second predetermined period (e.g., 0.3 seconds) is to reserve a reaction time for the low voltage controller 500. The reaction time may include the time consumed by sending the signal from the motor controller 600 and receiving the signal by the low voltage controller 500, the response time of the low voltage controller 500 and the response time of the brake 300. If the brake 300 is released too early, a slip may occur, and if is the brake 300 is released too late, an unsmooth running of the vehicle may occur. In addition, the second predetermined period may be adjusted according to actual requirements. By increasing or decreasing the value of the second predetermined period, a superior driving experience is ensured. In addition, within the second predetermined period (e.g., 0.3 seconds), the throttle may be depressed to a certain depth, and the motor controller 600 may enable a large initial output torque, which overcomes the sliding force, thus improving the user experience.

In the related art, a delay driving (including a delay torque output and a delay braking output) is generally performed on the brake when the vehicle is to be started on the ramp. The delay driving may have disadvantages of poor reliability, and thus the user experience is not good.

Table 1 shows differences between processing schemes in the related art and that in the parking interlock system for the vehicle. In Table 1, EPB is an abbreviation of electronic park brake system.

TABLE 1

| Comparison items | Member | | | |
|---|---|---|---|---|
| | The vehicle parking interlock system based on torque-speed information (the present application) | Delay torque output type of EPB | Delay interlock type of EPB | Torque transmission type of EPB |
| Condition of starting "interlock" | the vehicle speed and the torque remains zero for 0.5 s | the vehicle speed is zero | the vehicle speed is zero | the vehicle speed is zero |
| Condition of lifting "interlock" | the message signal "being about to output torque" sent from the motor controller is detected | the brake is depressed and the interlock is lifted at once | the brake is depressed, and the interlock is lifted after 2 s | the throttle is depressed, the torque output by the engine is transmitted to the whole vehicle, and a slight deformation of the body is detected by the sensor |
| Required technical measures due to its inherent shortcomings | totally unnecessary | the engine is required to output torque immediately and to keep outputting for 2 s, in order to assist the driver in moving from the brake to the throttle | higher operation requirement is needed for the driver; it is difficult to release the brake at the correct time, if the interlock time is too long, the vehicle body is broken, and if the interlock time is too short, a slip is easy to happen; an additional torque detection is needed | the amount of deformation is difficult to detect, since the sensor is unreliable due to a long-term use |
| Cost | low | lower | lower | high |
| Safety and reliability | high | common | common | low |
| Operability | very easy | cumbersome | cumbersome | unstable |

It can be seen from Table 1 that, differences between the EPBs in the related art and the vehicle parking interlock system of the present disclosure are conditions of starting the interlock and lifting the interlock.

For example, with respect to the "interlock starting", it needs to determine "whether the torque is zero" in the present disclosure, this is because, as known from Newton's second law, force generates speed, and thus the vehicle speed is output slightly later than the torque. If it is only determined whether the speed is zero, there may be a case in which the vehicle speed is zero but the torque is not zero, and thus there may be a big safety risk if the vehicle is locked at this time. By adding the torque determination, an accurate operation may be made in the case that the throttle is suddenly depressed when the vehicle speed is zero (i.e., the vehicle speed is zero but the torque is not zero), which may optimize the effect of "interlock starting", thus improving the safety of the vehicle. Furthermore, if it is only determined whether the vehicle speed is zero, it is unable to quickly and accurately confirm the driver's driving intention, which is inconvenient for the low voltage controller to respond rapidly. For example, when the vehicle is about to stop, and if only the vehicle speed is used as the judgment basis, the low voltage controller 500 needs to perform delay-filtering for 1 s before confirming that the vehicle speed is zero, and then starts the "vehicle parking interlock" function. However, according the embodiments of the present disclosure, it is determined whether the vehicle speed and the torque are zero simultaneously, and if both the vehicle speed and the torque remains zero for 0.5 seconds, the "vehicle parking interlock" function is started, which is very safe. Moreover, if the torque is zero from 0 to 0.5 s, the low voltage controller 500 doesn't need to filter the speed from 0.5 s to 1 s, which may speed up the response.

In addition, with respect to the "interlock lifting", there may be a big risk on the determination condition of lifting "automatic interlock" in the related art. For example, if the brake is released too early, it may cause the slip, and if the brake is released too late, it may cause damage to the chassis and motor/engine. The improvement to the determination condition of lifting "automatic interlock" in the related art may be "delay" and "determining whether the torque is outputted", however, the former requires high operation, and the later will cause damage to the chassis. The parking interlock system of the vehicle according to the present disclosure realizes a seamless transition between "parking" and "starting", especially when the vehicle is started on the ramp, thus enhancing traffic safety.

In the following, control pins of the low voltage controller 500 and control strategies of the low voltage controller 500 and motor controller 600 will be illustrated in combination with the above embodiments.

In some embodiments, as shown in FIG. 2, the ECAS state information, the door state information, the charging gun state information and the disabled guide state information are switching signals, which are normally open switches. One ends of the switches are connected to the control pins (i.e., pin 1, pin 2, pin 3 and pin 4) of the low voltage controller 500 respectively. The other ends of the switches are connected to the power supply 24V, and each of the control pins is effective when the voltage is 24V. When the ECAS state information is a kneeling state information, the corresponding normally open switch is switched on to connect the pin 1 with the 24V power supply and the pin 1 is effective, and a Boolean variable "pin 1" is set to "pin 1=1". The plurality of switches respectively corresponding to states of multiple doors are connected in parallel, and when any door is open, the corresponding switch is switched on to connect the pin 2 with the 24V power supply and the pin 2 is effective, and a Boolean variable "pin 2" is set to "pin 2=1". When the charging gun is connected to the vehicle, the corresponding switch is switched on to connect the pin 3 with the 24V power supply and the pin 3 is effective, and a Boolean variable "pin 3" is set to "pin 3=1". When the disabled guide is opened, the corresponding switch is switched on to connect the pin 4 with the 24V power supply and the pin 4 is effective, and a Boolean variable "pin 4" is set to "pin 4=1".

In some embodiments, the brake 300 is driven by the low voltage controller 500. When the brake 300 receives the 24V signal from the pin 5 of the low voltage controller 500, the brake 300 locks the vehicle. That is, when a Boolean variable "pin 5" is set to "pin 5=1" in the low voltage controller 50, the corresponding pin 5 outputs the 24V voltage signal.

Specifically, the motor controller 600 receives the throttle depth via messages. The throttle depth is indicated with 16 bit data, which represents the extent to which the throttle pedal is depressed (from 0% to 100%) in a certain level of precision. The motor controller 600 collects the vehicle speed value and sends it in the form of messages via the CAN bus. In addition, the motor controller 600 controls the excitation and power supply of the motor through the plurality of pins.

In addition, the low voltage controller 500 receives the torque message (16 bit signal), the vehicle speed message (16 bit signal) and the "outputting torque after 0.3 s" message (2 bit signal, obtained by processing the throttle depth signal) from the motor controller 600 via the CAN bus.

The control strategies of the low voltage controller 500 and the motor controller 600 are described as follows.

When the low voltage controller 500 detects at least one of "pin 1=1", "pin 2=1", "pin 3=1" or "pin 4=1", it sends messages to the motor controller 600 immediately for informing the motor controller 600 that the vehicle is unsafe and special attention should be paid to.

When the vehicle speed is zero and the torque is zero, and the message "outputting torque after 0.3 s" is continuously invalid (i.e. the driver has no intention to start the vehicle within 0.3 s), the low voltage controller 500 may function "torque interlock" after the condition holds 0.5 s, to control the brake 300 to lock the vehicle, and may also send the message "automatic interlock is started".

When the received message "outputting torque after 0.3 s" is effective, the "torque interlock" is lifted (this response has the highest priority in the whole program) within the third predetermined period (e.g., 0.05 s), and the message "interlock is lifted" is broadcast.

The only condition of lifting the interlock is detecting that the message "outputting torque after 0.3 s" is valid.

After the motor controller 600 sends the message "outputting torque after 0.3 s", it should ensure that the torque is outputted after 0.3 s. In addition, the message "outputting torque after 0.3 s" should be sent continuously within is to ensure that the message is received by the low voltage controller 500.

Figure 6:
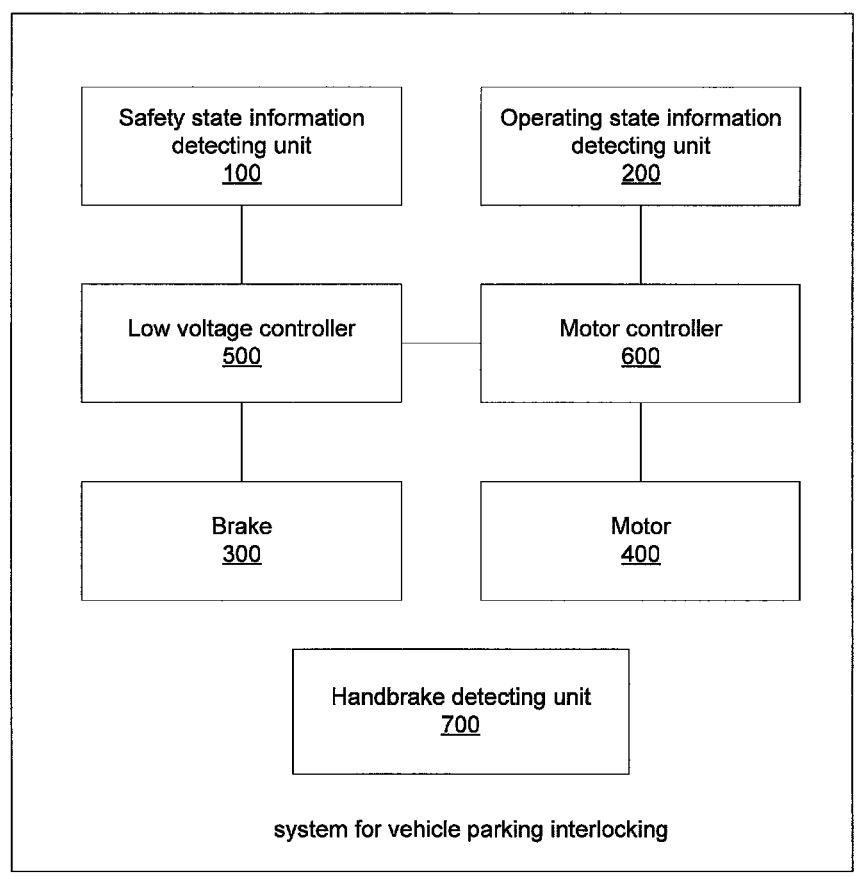
FIG. 6 is a block diagram of a parking interlock system for a vehicle according to another embodiment of the present disclosure.

In some embodiments, as shown in FIG. 6, the vehicle parking interlock system further includes a handbrake detecting unit 700. The handbrake detecting unit 700 is configured for detecting the state of the handbrake and for generating a warning when the handbrake is not pulled and the vehicle is powered off.

In some embodiments, when the vehicle parking interlock system is set as "normally locked", it may have possibility of over-locking, so the vehicle parking interlock system is set as "normally unlocked", and the vehicle is locked only when the condition for interlocking is satisfied. However, when the vehicle is powered off completely, it may be unable to park without the handbrake. In order to ensure that the handbrake has been pulled before the vehicle is powered off completely, the handbrake detecting unit 700 is used to inform the driver not to power off the vehicle when the handbrake is not pulled.

Figure 7:
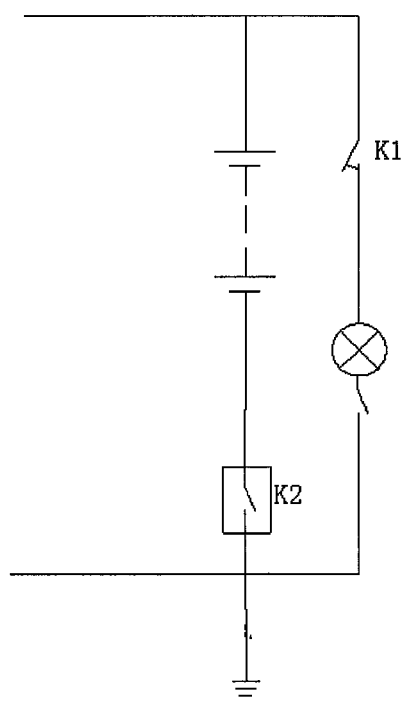
FIG. 7 is a schematic diagram of a handbrake detecting unit according to an embodiment of the present disclosure.

FIG. 7 is a schematic diagram of a handbrake detecting unit according to an embodiment of the present disclosure. As shown in FIG. 7, the handbrake is indicated as a normally closed switch K1. That is, when the handbrake is pulled, the switch K1 is switched off, and when the handbrake is not pulled, the switch K1 is switched on. The power supply gate is indicated as a normally open switch K2. That is, when the power supply gate is opened, the switch K2 is switched on, and when the power supply gate is closed, the switch K2 is switched off. When the handbrake is not pulled (the switch K1 is switched on), if the operator tries to open the power supply gate so as to power off the vehicle, then the switch K2 is switched on, and a red warning light lights on to warn the operator.

Figure 8:
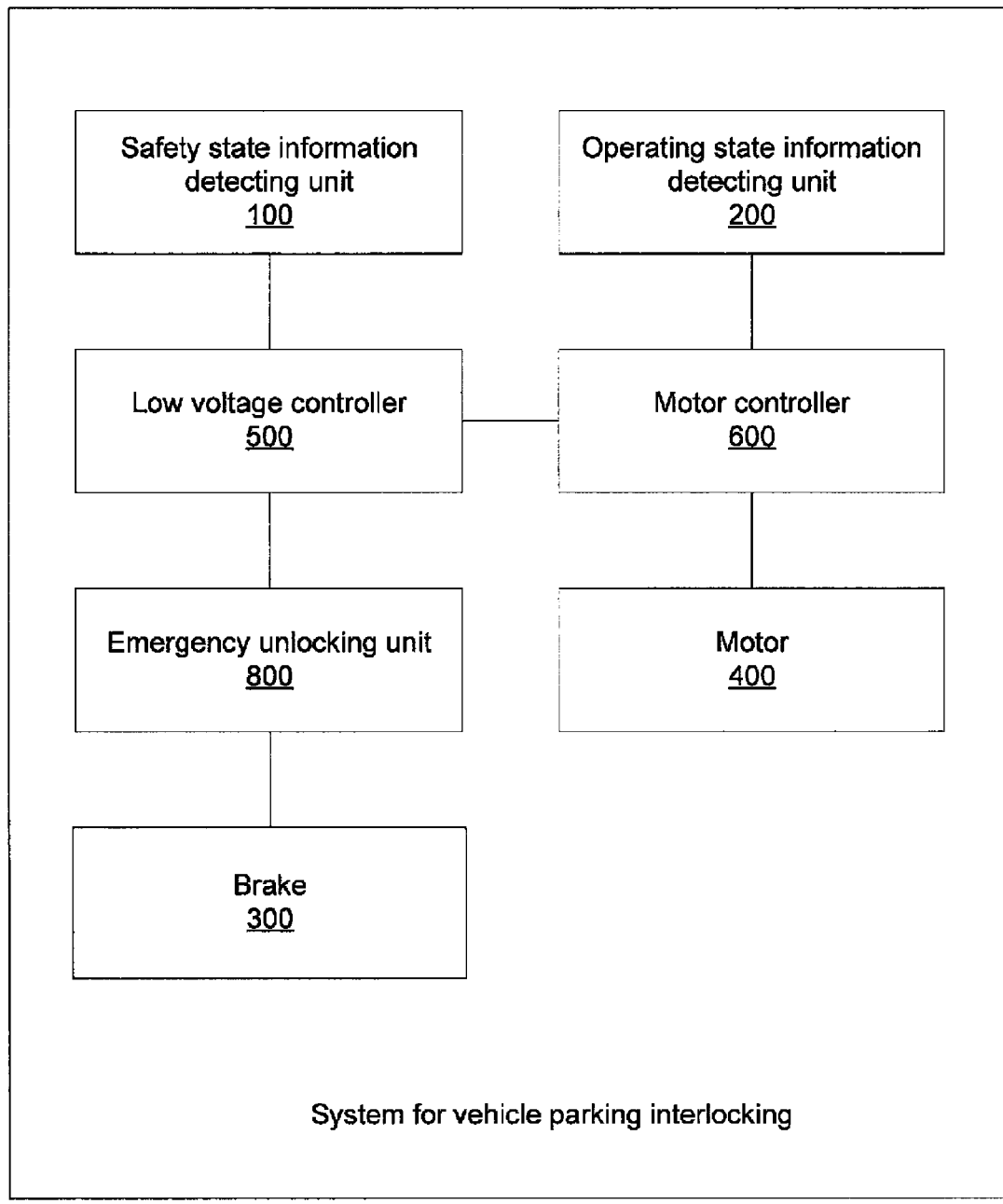
FIG. 8 is a block diagram of a parking interlock system for a vehicle according to yet another embodiment of the present disclosure.

FIG. 8 is a block diagram of a parking interlock system for a vehicle according to yet another embodiment of the present disclosure. As shown in FIG. 8, in some embodiments, the system further includes an emergency unlocking unit 800. The emergency unlocking unit 800 is configured for unlocking the brake 300 when the emergency unlocking unit 800 is triggered.

In some embodiments, when there is a fault occurring to the vehicle and the safety state information of the vehicle is false, the "automatic interlock" is performed continuously, which may result in that the vehicle is locked and cannot be dragged, thus affecting the user experience.

To avoid the above problem, as shown in FIG. 2, the emergency unlocking unit (normally closed switch K3) is connected between the pin 5 of the low voltage controller 500 and the brake 300 for starting the vehicle in emergency. The switch K3 is normally closed, and when a button corresponding to the switch K3 is pressed in emergency, the switch K3 is switched off, and the brake 300 unlocks the vehicle immediately. The emergency unlocking unit 800 is used for handling emergency situations to enhance safety.

Figure 9:
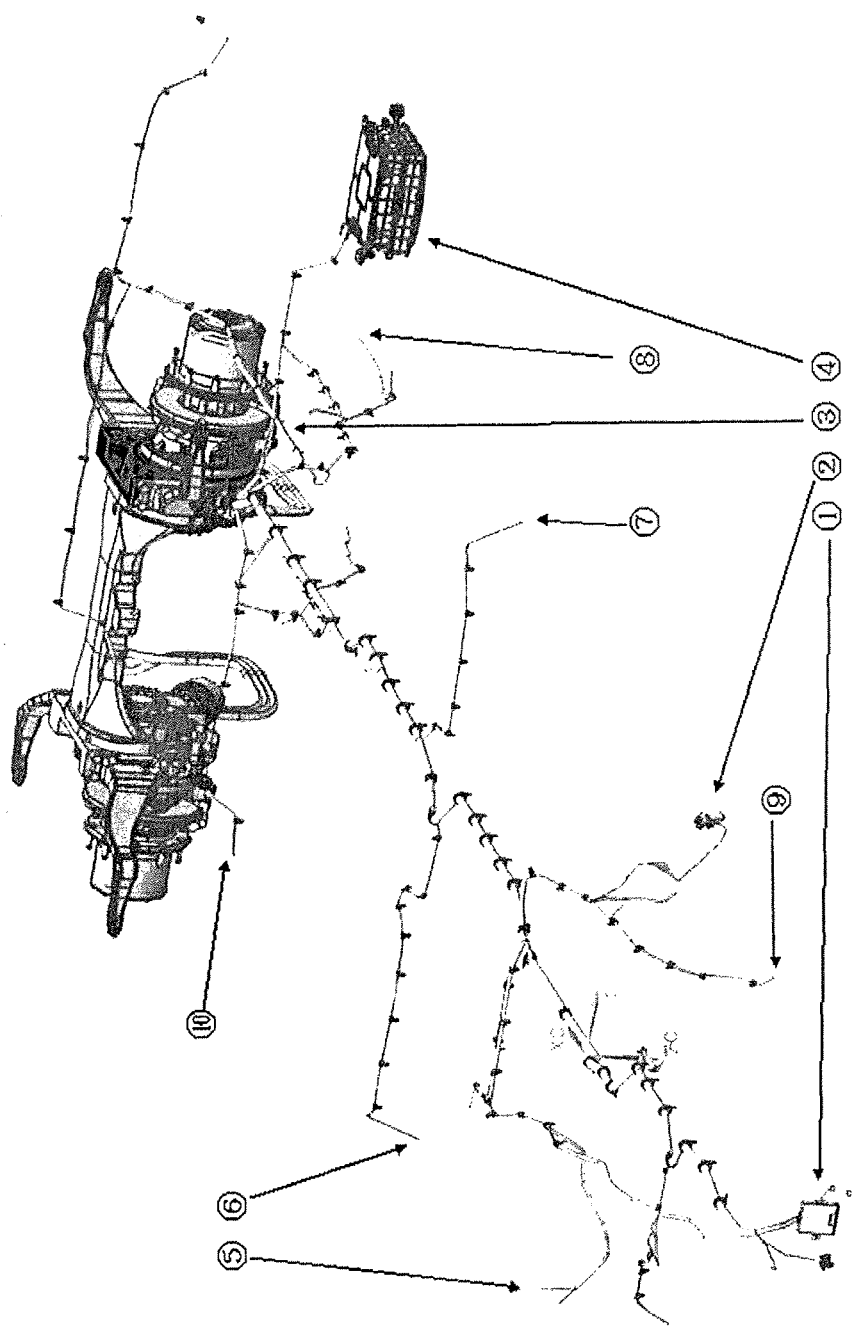
FIG. 9 is a schematic diagram showing a parking interlock system for a vehicle according to an embodiment of the present disclosure.

FIG. 9 is a schematic diagram showing a parking interlock system for a vehicle according to an embodiment of the present disclosure. Referring to FIG. 9, the structure of the vehicle parking interlock system becomes clearer. As shown in FIG. 9, the system includes a low voltage controller 1, a brake 2, a motor 3 and a motor controller 4. The brake 2 is controlled by the low voltage controller 1. The motor 3 is controlled by the motor controller 4. The door state information 5 is inputted to the low voltage controller 1. The disabled guide state information 6 is inputted to the low voltage controller 1. The ECAS state information 7 is inputted to the low voltage controller 1. The charging gun state information 8 is inputted to the low voltage controller 1. The throttle depth information 9 (for an electric bus, the accelerator pedal information) is inputted to the motor controller 4. The vehicle speed information 10 is inputted to the motor controller 4.

According to the present disclosure, a parking interlock method for a vehicle is also provided.

Figure 10:
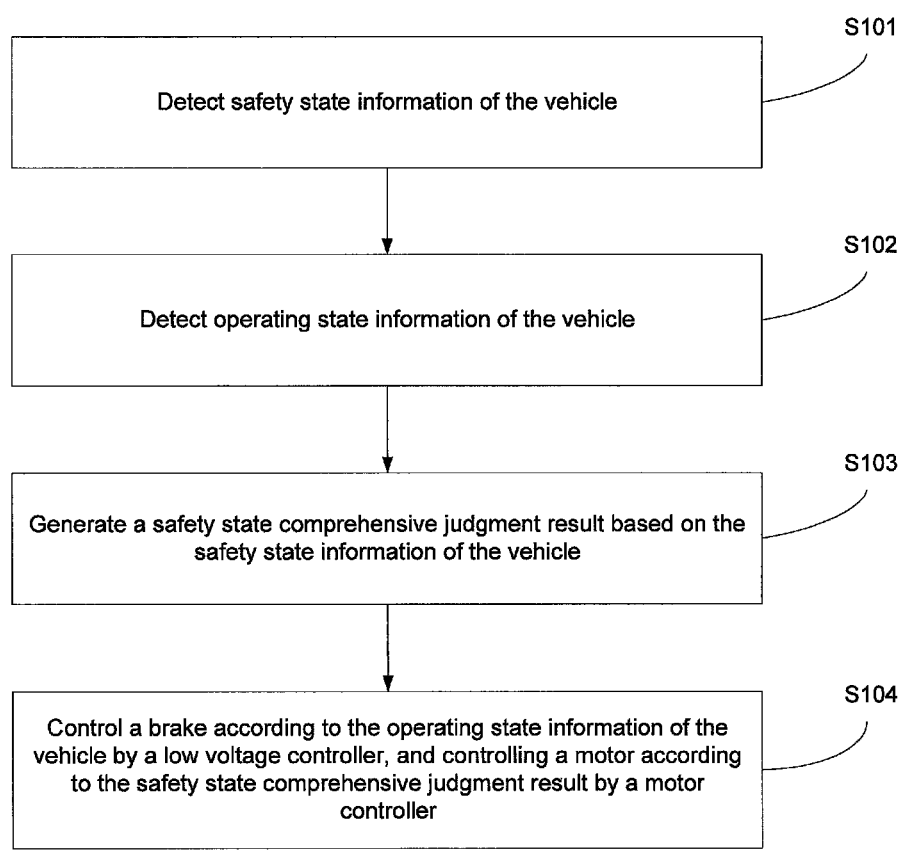
FIG. 10 is a flow chart of a parking interlock method for a vehicle according to an embodiment of the present disclosure.

FIG. 10 is a flow chart of a parking interlock method for a vehicle according to an embodiment of the present disclosure. As shown in FIG. 10, the method includes following steps.

At step S101, safety state information of the vehicle is detected.

In some embodiments, the safety state information of the vehicle may include at least one of charging gun state information (e.g., whether a charging gun is connected to the vehicle), disabled guide state information (e.g., the disabled guide is in an open state or a closed state), door state information (e.g., the door is in an open state or a closed state), and ECAS state information (e.g., the air suspension is in a kneeling state).

In some embodiments, the charging gun state information is generated by a charging gun charge state sensor, the disabled guide state information is generated by a disabled guide state sensor, the door state information is generated by a door state sensor, and the ECAS state information is obtained by an ECAS state sensor.

In some embodiments, when at least one of the conditions happens, such as the charging gun is connected to the vehicle, the disabled guide is opened, the door is opened, or the air suspension is in the kneeling state, there is a safety risk when the vehicle starts to move.

At step S102, operating state information of the vehicle is detected.

In some embodiments, the operating state information of the vehicle may include vehicle speed information and torque information.

In some embodiments, the vehicle speed information is generated by a vehicle speed sensor, and the torque information is acquired from calculating by the motor controller.

At step S103, a safety state judgment result is generated based on the safety state information of the vehicle.

In some embodiments, when it detects at least one of the conditions that the charging gun is connected to the vehicle, the disabled guide is opened, the door is opened, and the air suspension is in the kneeling state, the safety state judgment result is "the vehicle is in an unsafe condition at this time".

At step S104, a brake is controlled according to the operating state information of the vehicle and a motor is controlled according to the safety state judgment result.

In some embodiments, the low voltage controller controls the brake according to the operating state information of the vehicle, and the motor controller controls the motor according to the safety state judgment result.

In some embodiments, the low voltage controller and the motor controller communicate with each other via the CAN network for information exchange, and also communicate with the whole vehicle via the CAN network, in which bit rates of the low voltage controller and the motor controller are required to be matched with each other.

FIG. 2 shows a signal flow in the parking interlock system of the vehicle. As shown in FIG. 2, the low voltage controller sends the safety state judgment result to the motor controller, and the motor controller sends the operating state information of the vehicle to the low voltage controller, such that the low voltage controller controls the brake according to the operating state information of the vehicle, and the motor controller controls the motor according to the safety state judgment result.

In some embodiments, the vehicle parking interlock system may realize a vehicle starting prevention function. If the safety state judgment result is "the vehicle is in an unsafe condition at this time" when the vehicle is to be started, it needs to prevent the vehicle from starting, and then the low voltage controller sends the safety state judgment result to the motor controller, and the motor controller does not output torque, thereby preventing the vehicle from starting. Generally, a vehicle, for example, a bus, does not have the function of starting prevention, so the driver needs to observe the state of the vehicle and perform corresponding operations manually, which may distract the driver's attention and may also have the disadvantage of cumbersome operating. With the vehicle starting prevention function according to an embodiment of the present disclosure, user experience may be enhanced and vehicle safety may be improved. In addition, the information (i.e., the safety state judgment result) sent by the low voltage controller only occupies one message signal for notifying the motor controller whether the vehicle is safe.

With the parking interlock method for vehicle park interlocking, by detecting the safety state information of the vehicle and generating the safety state judgment result according to the safety state information of the vehicle, and by detecting the operating state information of the vehicle, the brake may be controlled according to the operating state information of the vehicle, and the motor may be controlled according to the safety state judgment result, thus improving the safety of the vehicle and enhancing the user experience.

In some embodiments, the parking interlock method for the vehicle may also realize an automatic interlock function and an automatic interlock lifting function.

The automatic interlock function is described as follows.

In some embodiments, step S104 includes: controlling the brake to lock the vehicle at an end of a first predetermined period when a speed and a torque of the vehicle are determined to be zero within the first predetermined period.

In some embodiments, when the operating state information of the vehicle indicates that the vehicle speed is zero and the torque is zero, and the operating state information of the vehicle holds for the first predetermined period (e.g., 0.5 seconds), the low voltage controller controls the brake to lock the vehicle. In some embodiments, the first predetermined time is a delay time before starting the automatic interlock function.

The automatic interlock lifting function is described as follows.

In some embodiments, step S104 includes: generating a motor starting instruction; controlling the motor to start when a second period has elapsed since the motor starting instruction is generated; and controlling the brake to unlock the vehicle according to the motor starting instruction within a third predetermined period, in which the third predetermined period is less than the second predetermined period.

In some embodiments, the motor controller sends the message "being about to output torque after 0.3 s" to the low voltage controller. The motor controller starts the motor when a second predetermined period has elapsed since the message is sent, and the low voltage controller unlocks the brake according the message "being about to output torque after 0.3 s" within the third predetermined period.

In some embodiments, when the vehicle is stationary, the motor controller performs a filtering processing on a throttle depth. When the "start" operation of the driver is confirmed, the motor controller sends the "being about to output torque" message signal (i.e., the motor starting instruction) to the low voltage controller for notifying, and the sending continues for 1 seconds. When the low voltage controller receives the message signal, the low voltage controller cancels the driving to the brake 300 within the third predetermined period (e.g., 0.05 seconds) so as to unlock the vehicle, and also sends a message "automatic interlock lifting" (the message is used for diagnostic, and the motor controller no longer collects the message). In addition, it should be ensured that the torque is output when 0.3 seconds has elapsed since the message signal "being about to output torque" is sent out. Thus, a seamless transition between parking and starting is achieved, especially when the vehicle is starting on a ramp, thus enhancing the traffic safety on the ramp.

It should be noted that, the throttle depth signal is collected by the motor controller. The motor controller needs to perform filtering and smoothing on the throttle depth signal to remove jitter and to confirm that the throttle depth signal is generated due to an intentional operation of the driver instead of a signal fluctuation. The main purpose of setting the second predetermined period (e.g., 0.3 seconds) is to reserve a reaction time for the low voltage controller. The reaction time may include the time consumed by sending the signal from the motor controller and receiving the signal by the low voltage controller, the response time of the low voltage controller and the response time of the brake. If the brake is released too early, a slip may occur, and if is the brake is released too late, an unsmooth running of the vehicle may occur. In addition, the second predetermined period may be adjusted according to actual requirements. By increasing or decreasing the value of the second predetermined period, a superior driving experience is ensured. In addition, within the second predetermined period (e.g., 0.3 seconds), the throttle may be depressed to a certain depth, and the motor controller may enable a large initial output torque, which overcomes the sliding force, thus improving the user experience.

In some embodiments, the method further includes: detecting a state of a handbrake, and generating a warning when the vehicle is powered off and the handbrake is not pulled.

In some embodiments, when the vehicle parking interlock system is set as "normally locked", it may have possibility of over-locking, so the vehicle parking interlock system is set as "normally unlocked", and the vehicle is locked only when the condition for interlocking is satisfied. However, when the vehicle is powered off completely, it may be unable to park without the handbrake. In order to ensure that the handbrake has been pulled before the vehicle is powered off completely, a handbrake detecting unit is used in the vehicle parking interlock system to inform the driver not to power off the vehicle when the handbrake is not pulled. FIG. 7 is a schematic diagram of a handbrake detecting unit according to an embodiment of the present disclosure. As shown in FIG. 7, the handbrake is indicated as a normally closed switch K1, that is, when the handbrake is pulled, the switch K1 is switched off, and when the handbrake is not pulled, the switch K1 is switched on. The power supply gate is indicated as a normally open switch K2, that is, when the power supply gate is opened the switch K2 is switched on, and when the power supply gate is closed, the switch K2 is switched off. When the handbrake is not pulled (the switch K1 is switched on), if the operator tries to open the power supply gate so as to power off the vehicle, then the switch K2 is switched on, and a red warning light lights to warn the operator.

In some embodiments, the method further includes: unlocking the brake when an emergency unlocking instruction is received.

In some embodiments, when there is a fault occurring to the vehicle and the safety state information of the vehicle is false, the "automatic interlock" is performed continuously, which may result in that the vehicle is locked and can't be dragged, thus affecting the user experience. To avoid the above problem, as shown in FIG. 2, the emergency unlocking unit (normally closed switch K3) is connected between the pin 5 of the low voltage controller and the brake for starting the vehicle in emergency. The switch K3 is normally closed, and when a button corresponding to the switch K3 is pressed (the emergency unlocking unit is triggered) in emergency, the switch K3 is switched off, and the brake unlocks the vehicle immediately. The emergency unlocking unit is used for handling emergency situations to enhance safety.

Any process or method described in a flow chart or described herein in other ways may be understood to include one or more modules, segments or portions including codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to acquire the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A parking interlock system of a vehicle, comprising:
a safety state information detecting unit, configured to detect safety state information of the vehicle;
an operating state information detecting unit, configured to detect operating state information of the vehicle;
a brake;
a motor;
a controller, connected to the safety state information detecting unit and the brake, respectively, and configured to generate a safety state judgment result based on the safety state information of the vehicle; and
a motor controller, connected to the controller, the operating state information detecting unit and the motor, respectively, and configured to receive the safety state judgment result from the controller, to control the motor according to the safety state judgment result, and to send the operating state information of the vehicle to the controller,
wherein
the controller is configured to control the brake to lock the vehicle at an end of a first predetermined non-zero period during which the operating state information indicates that the vehicle's speed and motor torque simultaneously remains zero,
the motor controller is configured to generate and send a motor starting instruction to the controller after the first predetermined non-zero period, the motor controller is configured to, subsequent to sending the motor starting instruction to the controller, control the motor to start after a second predetermined non-zero period, and the controller is further controlled to, subsequent to receiving the motor starting instruction from the motor controller, control the brake to unlock the vehicle according to the motor starting instruction within a third predetermined non-zero period, wherein the third predetermined non-zero period is less than the second predetermined non-zero period such that the vehicle is unlocked before the motor is started.

2. The system according to claim 1, wherein the safety state information of the vehicle comprises at least one of charging gun state information, disabled guide state information, door state information, and ECAS state information, and the operating state information of the vehicle comprises vehicle speed information and torque information.

3. The system according to claim 1, further comprising:
a handbrake detecting unit configured to detect a state of a handbrake, and to generate a warning when the vehicle is powered off and the handbrake is not pulled.

4. The system according to claim 1, further comprising:
an emergency unlocking unit for unlocking the brake when the emergency unlocking unit is triggered.

5. A parking interlock method for a vehicle, comprising:
detecting, by a safety state information detecting unit, safety state information of the vehicle;
detecting, by an operating state information detecting unit, operating state information of the vehicle;
generating, by a controller, a safety state judgment result based on the safety state information of the vehicle provided by the safety state information detecting unit to the controller;
controlling, by the controller, a brake according to the operating state information of the vehicle provided by the operating state information detecting unit to the controller via a motor controller; and
controlling, by the motor controller, a motor according to the safety state judgment result provided by the controller to the motor controller, wherein controlling, by the controller, the brake according to the operating state information of the vehicle and controlling, by the motor controller, the motor according to the safety state judgment result comprises further comprising:

controlling, by the controller, the brake to lock the vehicle at an end of a first predetermined non-zero period during which the operating state information indicates that the vehicle's speed and motor torque simultaneously remains zero, generating and sending, by the motor controller, a motor starting instruction to the controller after the first predetermined non-zero period;

controlling, by the motor controller, subsequent to sending the motor starting instruction to the controller, the motor to start after a second predetermined non-zero period; and controlling, by the controller, subsequent to receiving the motor starting instruction from the motor controller, the brake to unlock the vehicle according to the motor starting instruction within a third predetermined non-zero period, wherein the third predetermined non-zero period is less than the second predetermined non-zero period such that the vehicle is unlocked before the motor is started.

6. The method according to claim 5, wherein the safety state information of the vehicle comprises at least one of charging gun state information, disabled guide state information, door state information, and ECAS state information, and the operating state information of the vehicle comprises vehicle speed information and torque information.

7. The method according to claim 5, further comprising:
detecting a state of a handbrake; and
generating a warning when the vehicle is powered off and the handbrake is not pulled.

8. The method according to claim 5, further comprising:
unlocking the brake when an emergency unlocking instruction is received.

* * * * *